US012166347B2

(12) United States Patent
Heo et al.

(10) Patent No.: US 12,166,347 B2
(45) Date of Patent: Dec. 10, 2024

(54) CAPACITY DESIGN METHOD AND APPARATUS FOR PERFORMING SOLAR POWER GENERATION OF RESIDENTIAL COMPLEX

(71) Applicant: ELECTRONICS AND TELECOMMUNICATIONS RESEARCH INSTITUTE, Daejeon (KR)

(72) Inventors: Sewan Heo, Daejeon (KR); Tai-yeon Ku, Daejeon (KR); Wan Ki Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 540 days.

(21) Appl. No.: 17/473,791

(22) Filed: Sep. 13, 2021

(65) Prior Publication Data

US 2022/0085605 A1 Mar. 17, 2022

(30) Foreign Application Priority Data

Sep. 14, 2020 (KR) .......................... 10-2020-0117679

(51) Int. Cl.
*H02J 3/00* (2006.01)
*G06Q 50/06* (2024.01)
*H02J 3/38* (2006.01)

(52) U.S. Cl.
CPC .............. *H02J 3/003* (2020.01); *G06Q 50/06* (2013.01); *H02J 3/004* (2020.01); *H02J 3/381* (2013.01); *H02J 2203/10* (2020.01); *H02J 2300/24* (2020.01)

(58) Field of Classification Search
CPC ............ H02J 3/003; H02J 3/004; H02J 3/381; H02J 2203/10; H02J 2300/24; H02J 2203/20; H02J 2310/12; H02J 3/32; G06Q 50/06; Y02E 10/56; Y02E 60/00; Y02E 70/30; Y02E 10/50; Y04S 40/20; Y04S 10/123
See application file for complete search history.

(56) References Cited

U.S. PATENT DOCUMENTS

| 2012/0130556 | A1* | 5/2012 | Marhoefer | ............. | G05B 15/02 |
| | | | | | 700/291 |
| 2013/0024044 | A1* | 1/2013 | Sharma | ..................... | H02J 3/32 |
| | | | | | 700/297 |
| 2013/0204454 | A1 | 8/2013 | Choi et al. | | |
| 2016/0322823 | A1 | 11/2016 | Park et al. | | |
| 2017/0256004 | A1* | 9/2017 | Hooshmand | ............. | H02J 3/28 |

(Continued)

FOREIGN PATENT DOCUMENTS

| CN | 108599146 B | * | 9/2021 | ............. | H02J 3/008 |
| JP | 2009-177941 A | | 8/2009 | | |
| JP | 2013-42652 A | | 2/2013 | | |

(Continued)

*Primary Examiner* — Mohammad Ali
*Assistant Examiner* — Dhruvkumar Patel

(57) ABSTRACT

Provided is a capacity design method and apparatus for performing solar power generation of a residential complex that may calculate a capacity of a solar power generator and an energy storage device to achieve energy independence of a residential complex including a plurality of housings and reduce burden affecting a grid.

13 Claims, 5 Drawing Sheets

(56) References Cited

U.S. PATENT DOCUMENTS

2018/0351362 A1* 12/2018 Zhu .......................... H02J 3/14

FOREIGN PATENT DOCUMENTS

| | | | |
|---|---|---|---|
| JP | 2016-5347 A | | 1/2016 |
| JP | 2016005347 A | * | 1/2016 |
| JP | 2020-501491 A | | 1/2020 |
| KR | 10-1396094 B1 | | 5/2014 |
| KR | 10-1467221 B1 | | 12/2014 |
| KR | 10-2015-0040168 A | | 4/2015 |
| KR | 20170052031 A | * | 5/2017 |
| KR | 10-1821807 B1 | | 1/2018 |
| KR | 102072972 B1 | * | 2/2020 |

* cited by examiner

CAPACITY DESIGN METHOD AND APPARATUS FOR PERFORMING SOLAR POWER GENERATION OF RESIDENTIAL COMPLEX

CROSS-REFERENCE TO RELATED APPLICATION

This application claims the benefit of Korean Patent Application No. 10-2020-0117679 filed on Sep. 14, 2020, in the Korean Intellectual Property Office, the entire disclosure of which is incorporated herein by reference for all purposes.

BACKGROUND

1. Field of the Invention

One or more example embodiments relate to a capacity design method and apparatus for performing solar power generation of a residential complex, and more particularly, to a method and apparatus for designing a capacity of an energy storage device in a residential complex through solar power generation.

2. Description of the Related Art

As an energy demand increases along with industrial development, the use of new and renewable energy facilities is gradually increasing to replace energy production using existing fossil fuels and to reduce carbon dioxide emission.

As a representative new and renewable energy source, a solar power generator that is one of power generation methods spotlighted as clean energy among new and renewable energy has been distributed from large-scale facilities to individual homes. Solar power generators used in many housings serve to reduce power consumption in such a manner that electricity generated as a small capacity is immediately consumed.

Here, since an amount of power generated by a solar power generator varies depending on climate and weather, it is difficult to accurately predict a power generation amount, which is unstable in terms of power supply and demand. For this reason, it may be impossible to establish an accurate energy supply and demand plan with solar power alone. Therefore, there is a need to build a stable power operation system by storing electricity produced by the solar power in a battery and then supplying power.

Currently, a prosumer installing a relatively large capacity solar power generator in a housing and selling surplus electricity has appeared. Also, according to an increase in the spread of such solar power generators, burden on a power grid is increasing, such as electricity being sent back during the daytime.

Accordingly, there is a need for a method that may minimize burden of a power grid and may calculate an optimal capacity of an energy storage device.

SUMMARY

Example embodiments provide a capacity design apparatus and method that may design a solar power generation amount enabling energy independence for a residential complex that desires to install a solar power generator.

Example embodiments also provide a capacity design apparatus and method that may design a capacity of an energy storage device for peak reduction of power generation to reduce a grid burden according to excessive power generation of a solar power generator designed for a residential complex.

According to an aspect, there is provided a capacity design method including receiving load profiles of a housing from at least one housing among a plurality of housings constituting a residential complex; determining a power profile that includes a consumption amount and a production amount of the residential complex using a load profile of the residential complex according to the load profiles of the housing; determining a reduction standard according to a solar power generation amount in the residential complex from the power profile of the residential complex; and determining a capacity of each energy storage device connected to the at least one housing based on the reduction standard of the residential complex.

The determining of the power profile may include generating the load profile of the residential complex by extracting a time zone in which power in the housing is consumed from each of the load profiles of the housing and by synchronizing the load profiles of the housing by the extracted time zone.

The determining of the power profile may include determining a solar power generation amount annually generated in the residential complex from the load profile of the residential complex; generating a production profile corresponding to the determined solar power generation amount; and determining the power profile that includes the consumption amount and the production amount of the residential complex by time zone using the production profile and the load profile of the residential complex.

The determining of the solar power generation amount may include generating a solar power generation amount corresponding to an energy independence rate in the residential complex using a power generation profile according to a unit capacity, and the power generation profile may be information that represents an amount of power generated through solar power.

The determining of the reduction standard may include analyzing a magnitude of power annually generated in the residential complex based on the determined power profile; and determining the reduction standard in consideration of a peak reduction amount according to the magnitude of power.

The determining of the capacity may include determining a required power capacity and energy capacity for charging or discharging energy stored in an energy storage device based on the determined reduction standard; and determining the capacity of each energy storage device connected to the at least one housing based on the required power capacity and energy capacity.

According to another aspect, there is provided a capacity design method including receiving a load profile of each housing from each of a plurality of housings included in a residential complex; synchronizing a time zone for the load profile of each housing; determining a load profile of the residential complex using a load profile value of each housing corresponding to the synchronized time zone; determining a power profile that includes a consumption amount and a production amount of the residential complex by time zone by analyzing the load profile of the residential complex; determining a reduction standard of the residential complex by analyzing a magnitude of power annually generated in the residential complex based on the power profile; determining a capacity of each energy storage device connected to the at least one housing based on the reduction standard of the residential complex; and calculating cost of an energy storage device corresponding to the determined capacity of each energy storage device in consideration of a unit price per unit capacity.

The determining of the capacity may include determining a required power capacity and energy capacity for charging or discharging energy stored in an energy storage device based on the determined reduction standard and then determining the capacity of each energy storage device connected to the at least one housing based on the required power capacity and energy capacity.

The calculating of the cost of the energy storage device may include calculating cost of an energy storage device corresponding to the power capacity and the energy capacity in consideration of unit price per unit capacity.

According to still another aspect, there is provided a capacity design apparatus including a processor, wherein the processor is configured to receive load profiles of a housing from at least one housing among a plurality of housings constituting a residential complex, determine a power profile that includes a consumption amount and a production amount of the residential complex using a load profile of the residential complex according to the load profiles of the housing, determine a reduction standard according to a solar power generation amount in the residential complex from the power profile of the residential complex, and determine a capacity of each energy storage device connected to the at least one housing based on the reduction standard of the residential complex.

The processor may be configured to generate the load profile of the residential complex by extracting a time zone in which power in the housing is consumed from each of the load profiles of the housing and by synchronizing the load profiles of the housing by the extracted time zone.

The processor may be configured to determine a solar power generation amount annually generated in the residential complex from the load profile of the residential complex, generate a production profile corresponding to the determined solar power generation amount, and determine the power profile that includes the consumption amount and the production amount of the residential complex by time zone using the production profile and the load profile of the residential complex.

The processor may be configured to generate a solar power generation amount corresponding to an energy independence rate in the residential complex using a power generation profile according to a unit capacity, and the power generation profile may be information that represents an amount of power generated through solar power.

The processor may be configured to analyze a magnitude of power annually generated in the residential complex based on the determined power profile, and determine the reduction standard in consideration of a peak reduction amount according to the magnitude of power.

The processor may be configured to determine a required power capacity and energy capacity for charging or discharging energy stored in an energy storage device based on the determined reduction standard, and determine the capacity of each energy storage device connected to the at least one housing based on the required power capacity and energy capacity.

According to still another aspect, there is provided a capacity design apparatus including a processor. The processor is configured to receive a load profile of each housing from each of a plurality of housings included in a residential complex, synchronize a time zone for the load profile of each housing, determine a load profile of the residential complex using a load profile value of each housing corresponding to the synchronized time zone, determine a power profile that includes a consumption amount and a production amount of the residential complex by time zone by analyzing the load profile of the residential complex, determine a reduction standard of the residential complex by analyzing magnitude of power annually generated in the residential complex based on the power profile, determine a capacity of each energy storage device connected to the at least one housing based on the reduction standard of the residential complex, and calculate cost of an energy storage device corresponding to the determined capacity of each energy storage device in consideration of a unit price per unit capacity.

The processor may be configured to determine a required power capacity and energy capacity for charging or discharging energy stored in an energy storage device based on the determined reduction standard and then determine the capacity of each energy storage device connected to the at least one housing based on the required power capacity and energy capacity.

The processor may be configured to calculate cost of an energy storage device corresponding to the power capacity and the energy capacity in consideration of unit price per unit capacity.

Additional aspects of example embodiments will be set forth in part in the description which follows and, in part, will be apparent from the description, or may be learned by practice of the disclosure.

According to example embodiments, a capacity design apparatus and method may design a solar power generation amount enabling energy independence for a residential complex that desires to install a solar power generator.

According to example embodiments, a capacity design apparatus and method may design a capacity of an energy storage device for peak reduction of power generation to reduce a grid burden according to excessive power generation of a solar power generator designed for a residential complex.

According to example embodiments, a capacity design apparatus and method may calculate a capacity of a solar power generator and an energy storage device to achieve energy independence of a residential complex and reduce grid burden.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
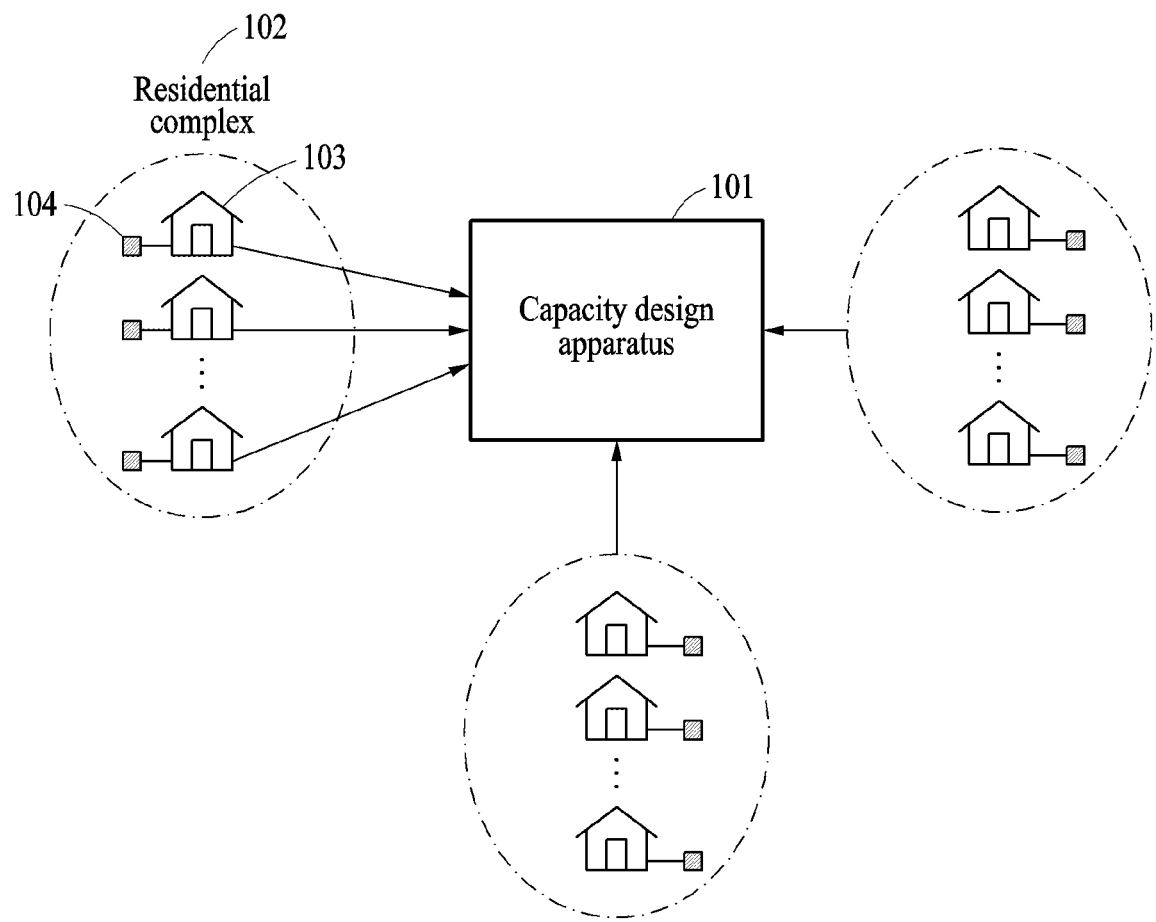
FIG. 1 illustrates an overall configuration including a capacity design apparatus to describe a capacity design of an energy storage device of a residential complex for solar power generation according to an example embodiment.

FIG. 1 illustrates an overall configuration including a capacity design apparatus to describe a capacity design of an energy storage device of a residential complex for solar power generation according to an example embodiment.

Referring to FIG. 1, a capacity design apparatus 101 may design a capacity of a solar power generator that enables energy independence for a residential complex 102 that desires to install the solar power generator. Also, the capacity design apparatus 101 may design a capacity of an energy storage device 104 for peak reduction of power generation to reduce a grid burden according to power generation in each home.

In detail, the capacity design apparatus 101 may receive a load profile of each housing 103 from a plurality of housings included in the residential complex 102 for solar power generation. Each housing 103 may be connected to the corresponding energy storage device 104, and the energy storage device 104 serves to stably supply power through information exchange between a power supplier and a power consumer in real time. The energy storage device 104 may supply power through combination with a new and renewable energy source such as solar power and wind power.

The capacity design apparatus 101 may generate a load profile of the residential complex 102 by adding values of the same time zone as one with respect to the received load profiles of each housing 103. The capacity design apparatus 101 may calculate an annual total load amount by analyzing the load profile of the residential complex 102 and may calculate a capacity of the solar power generator capable of meeting a given energy independence rate using a solar power generation profile for a given unit capacity.

The capacity design apparatus 101 may generate the power profile of the residential complex 102 by adding a residential complex load profile and a power generation profile corresponding to the capacity of the solar power generator by time zone.

The capacity design apparatus 101 may analyze maximum power generation through the year from the power profile of the residential complex 102 and may generate a reduction standard of power generation corresponding to a given peak reduction amount. The capacity design apparatus 101 may apply the reduction standard to the power profile of the residential complex 102, and may calculate a power capacity and an energy capacity of the energy storage device 104 capable of charging power generation exceeding the reduction standard during every daytime and discharging the same during every nighttime.

The capacity design apparatus 101 may calculate cost of the energy storage device 104 corresponding to a capacity that is calculated using cost per unit capacity based on the power capacity and the energy capacity of the energy storage device 104. Here, to change a peak reduction amount and verify the capacity and cost of the energy storage device 104 herein, the capacity design apparatus 101 may generate a reduction standard of new power generation for the changed peak reduction amount and may recalculate the capacity and cost of the energy storage device 104. Also, the example embodiment may calculate a capacity and cost corresponding to various reduction amounts through iterative flow.

Figure 2:
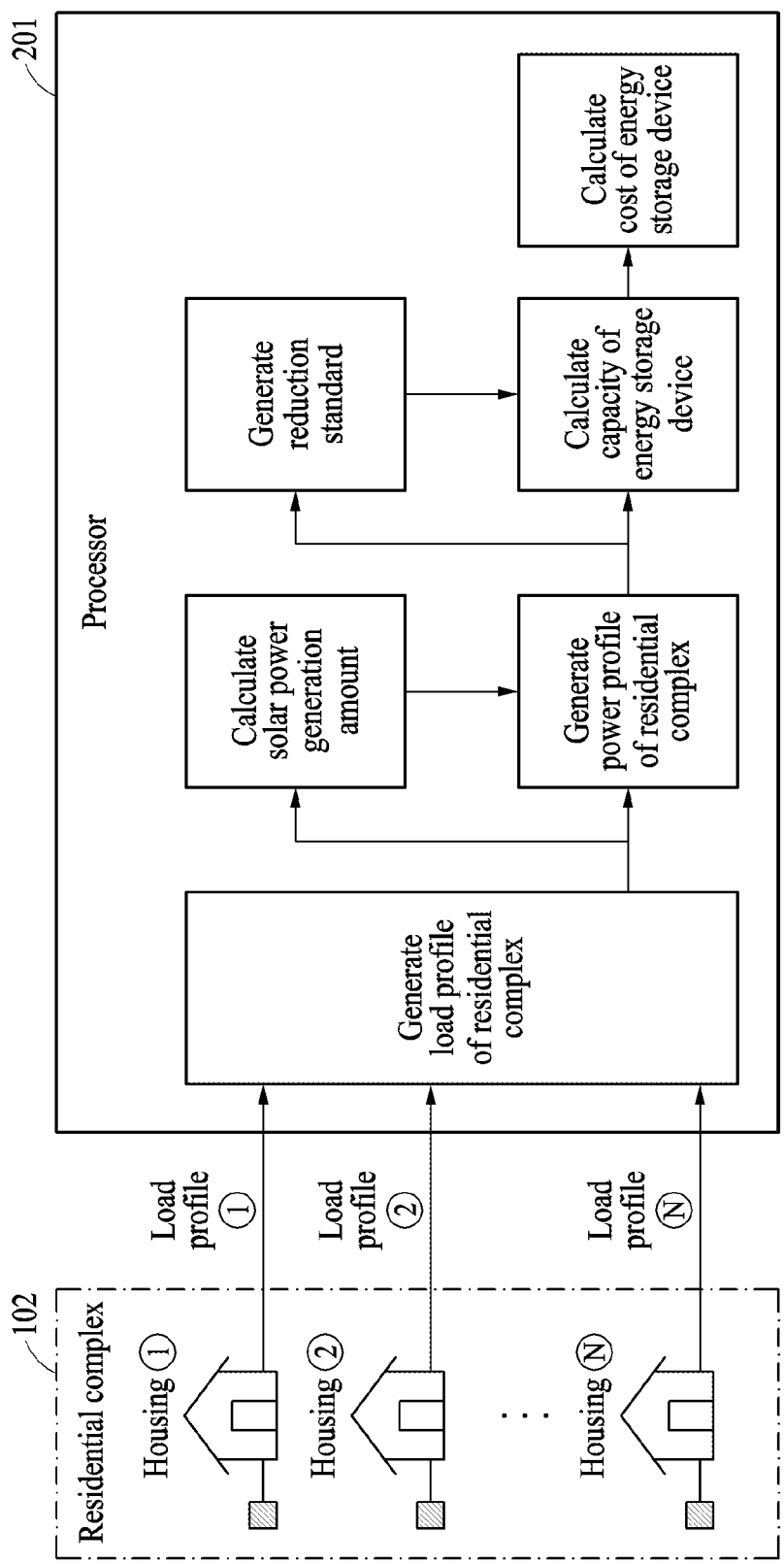
FIG. 2 illustrates a detailed configuration of a capacity design apparatus according to an example embodiment.

FIG. 2 illustrates a detailed configuration of a capacity design apparatus according to an example embodiment.

Referring to FIG. 2, the capacity design apparatus 101 may include a processor 201. The processor 201 may calculate a capacity of the solar power generator and the energy storage device 104 to achieve energy independence of the residential complex 102 including the plurality of housings and to reduce the effect against a grid. To this end, the processor 201 may perform the following process.

The processor 201 may generate a load profile of the residential complex 102. In detail, the processor 201 may generate the load profile of the residential complex 102 by receiving load profiles from the plurality of housings and by summing values of all the load profiles by time zone.

For example, if all the time zones of load profiles received from the plurality of housings are not the same, the processor 201 may perform synchronization such that the time zones of the respective load profile may be identical. Also, if missing data is present, the processor 201 may replace the missing data with similar data such that all the time zones of the load profiles may be identical.

The processor 201 may calculate an annual total power amount from each of the load profiles received from the plurality of housings. The processor 201 may calculate a capacity of the solar power generator corresponding to a given energy independence rate using a power generation profile about solar power given for a unit capacity.

For example, when an annual total load amount of the residential complex 102 is 10 megawatts (MWh) and the solar power generator with the unit capacity of 1 kilowatt (kW) generates 1 MWh per year, the processor 201 requires 10 kW of solar power generation to achieve an energy independence rate of 100%. Also, 15 kW of solar power generation may be required to achieve the energy independence rate of 150%. Therefore, the processor 201 may calculate the capacity of the solar power generator corresponding to the energy independence rate.

The processor 201 may generate a power profile of the residential complex 102. The processor 201 may generate the power profile of the residential complex 102 by adding a solar power generation profile corresponding to the calculated capacity of the solar power generator and the load profile of the residential complex 102 by time zone.

The load profile of the residential complex 102 corresponds to consumption of power, whereas the solar power generation profile corresponds to production of power generation. Therefore, the load profile of the residential complex 102 and the solar power generation profile have different characteristics.

For example, the load profile of the residential complex 102 has a positive value and a production profile corresponding to the solar power generation profile has a negative value. The residential complex power profile in which the load profile of the residential complex 102 and the production profile are combined may have the positive value and the negative value at the same time. Here, the positive value may represent consumption and the negative value may represent production.

The processor 201 may generate a reduction standard. The processor 201 may analyze a maximum magnitude of power generation through the year from the load profile of the residential complex 102 and may generate a reduction standard of peak power generation corresponding to a given peak reduction amount. For example, if the peak power generation is given as 10 kW and the peak reduction amount is given as 30% or 3 kW, the reduction standard of the peak power generation is 7 kW.

The processor 201 may calculate a capacity of the energy storage device 104. The processor 201 may calculate a power capacity and an energy capacity of the energy storage device 104 required for charging or discharging energy, to limit the power profile of the residential complex 102 not to exceed the reduction standard of peak power generation.

For example, if an annual peak power generation is 10 kW and a peak reduction standard is 7 kW, a required power capacity of the energy storage device 104 is 3 kW. Also, an energy amount maximized by calculating an energy amount per day for power that exceeds 7 kW may be the required energy capacity of the energy storage device 104. The energy storage device 104 may store solar energy that exceeds 7 kW with an output of 3 kW or less during every daytime and may discharge the stored energy during every nighttime.

Here, discharge energy of the energy storage device 104 may be used to reduce a load peak in the nighttime. Also, discharging of the energy storage device 104 may continue until a charging state becomes lowest for charging of a next day.

The processor 201 may calculate cost of the energy storage device 104. That is, the processor 201 may calculate total cost corresponding to the power capacity and the energy capacity of the energy storage device 104 based on cost to a given unit power capacity and cost to a given unit energy capacity.

For example, if the given unit power capacity is 100 won per 1 kW and the unit given energy capacity is 200 won per 1 kWh, cost of the energy storage device 104 having the power capacity of 3 kW and the energy capacity of 10 kWh is 2,300 won.

Figure 3:
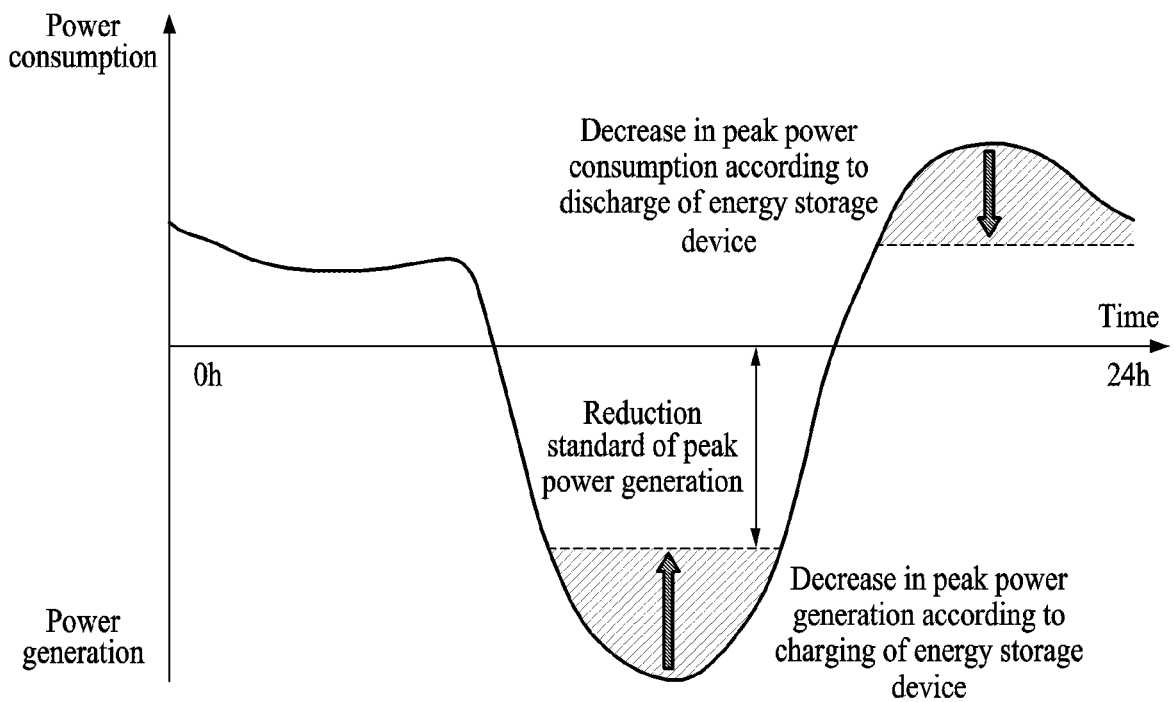
FIG. 3 is a graph showing an example of a power profile during a day by driving an energy storage device of a residential complex according to an example embodiment.

FIG. 3 is a graph showing an example of a power profile during the day by driving an energy storage device of a residential complex according to an example embodiment.

Referring to the graph of FIG. 3, when a time runs from 0 hour to 24 hours, power consumption gradually decreases during the early morning hours and there is no power consumption and remains only power generation during the daytime due to the power generation by a solar power generator.

According to the graph, when the power generation gradually increases and exceeds a reduction standard of peak power generation, an energy storage device is charged with the same power for the power generation that exceeds the reduction standard. In this manner, surplus power generation is offset and final power generation is maintained at a level of the reduction standard.

Here, since a chargeable capacity is fixed for the energy storage device, the energy storage device needs to discharge energy stored during the daytime during the nighttime and may be charged the next day. Therefore, the energy storage device repeatedly runs charging and discharging every day. Also, since there is no power generation in the nighttime, only power consumption is present. Therefore, if energy of the energy storage device is discharged, the discharged power offsets the power consumption, which leads to decreasing a peak power consumption.

According to a decrease in the peak power generation and the peak power consumption of the energy storage device, a number of peaks for receiving or transmitting power from an actual grid may decrease.

Figure 4:
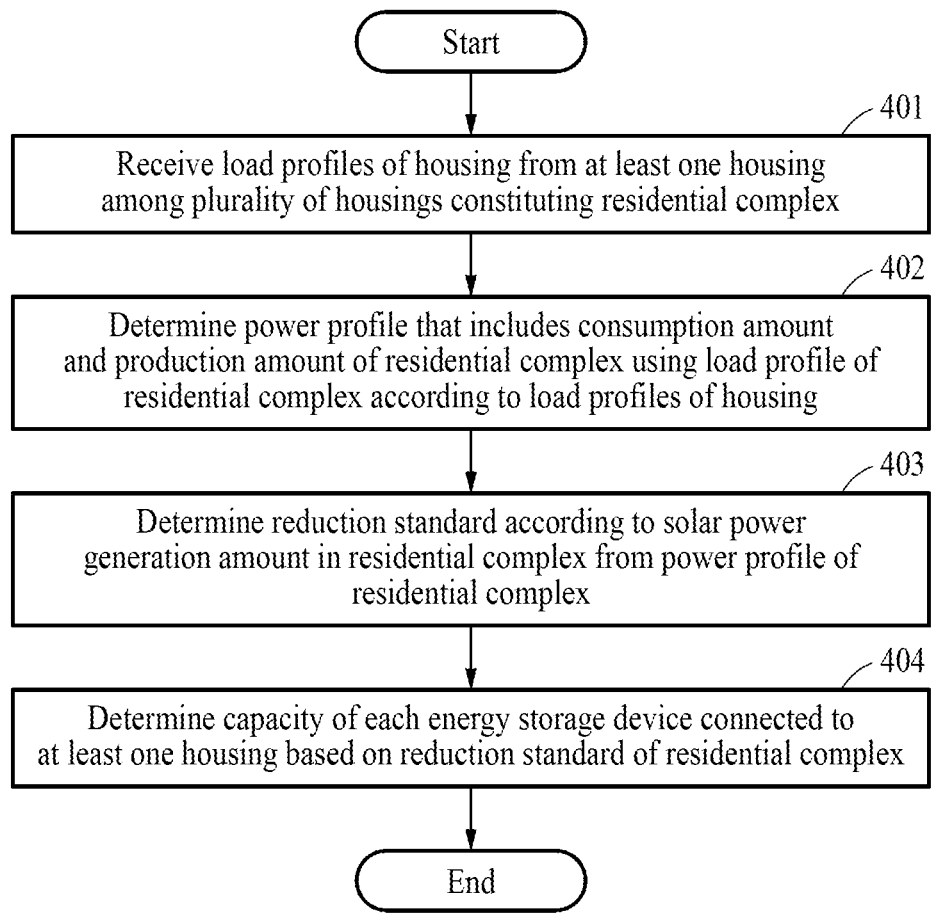
FIG. 4 is a flowchart illustrating a capacity design method according to an example embodiment.

FIG. 4 is a flowchart illustrating a capacity design method according to an example embodiment.

In operation 401, a capacity design apparatus according to an example embodiment may receive load profiles of a housing from at least one housing among a plurality of housings constituting a residential complex. The load profile may be information that represents a consumption amount used in each housing within the residential complex.

In operation 402, the capacity design apparatus may determine a power profile that includes a consumption amount and a production amount of the residential complex using a load profile of the residential complex according to the load profiles of the plurality of housings constituting the residential complex. In detail, the capacity design apparatus may extract a time zone in which power in each housing is consumed based on the load profiles of the housing. The capacity design apparatus may generate the load profile of the residential complex by synchronizing the load profiles by extracted time zone.

The capacity design apparatus may determine a solar power generation amount annually generated in the residential complex from the load profile of the residential complex. The capacity design apparatus may generate a solar power generation amount in the residential complex using a power generation profile according to a unit capacity. Here, the power generation profile may be information that represents a power generation amount through solar power. The solar power generation amount may be a power generation amount corresponding to an energy independence rate through energy saving and generation in the residential complex.

The capacity design apparatus may generate a production profile corresponding to the solar power generation amount. The capacity design apparatus may determine the power profile that includes the consumption amount and the production amount of the residential complex by time zone using the production profile and the load profile of the residential complex. The power profile may be information that represents a consumption amount and a production amount for 24 hours with respect to the residential complex for solar power generation.

In operation 403, the capacity design apparatus may determine a reduction standard according to a solar power generation amount in the residential complex from the power profile of the residential complex. The capacity design apparatus may analyze a magnitude of power annually generated in the residential complex based on the power profile. The capacity design apparatus may determine the reduction standard in consideration of a peak reduction amount according to the magnitude of power.

In operation 404, the capacity design apparatus may determine a capacity of each energy storage device connected to the at least one housing based on the reduction standard of the residential complex. The capacity design apparatus may determine a required power capacity and energy capacity for charging or discharging energy stored in an energy storage device based on the reduction standard. The capacity design apparatus may determine the capacity of each energy storage device connected to the at least one housing based on the required power capacity and energy capacity.

Figure 5:
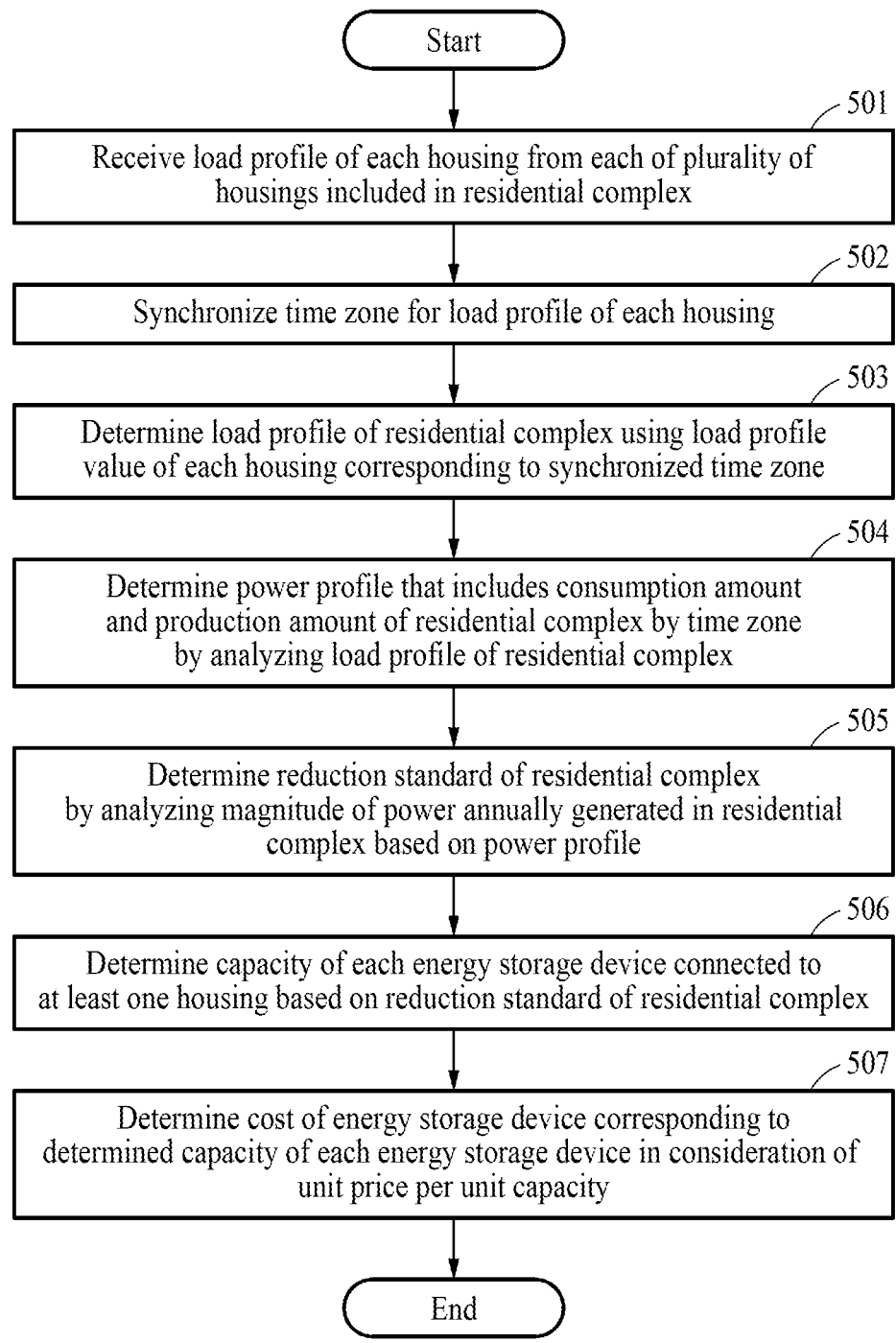
FIG. 5 is a flowchart illustrating a capacity design method according to another example embodiment.

FIG. 5 is a flowchart illustrating a capacity design method according to another example embodiment.

In operation 501, a capacity design apparatus according to an example embodiment may receive a load profile of each housing from each of a plurality of housings included in a residential complex for solar power generation. Each of the plurality of housings included in the residential complex may be connected to an energy storage device and the energy storage device serves to stably supply power and may transfer the load profile of the housing to the capacity design apparatus. The capacity design apparatus may receive the load profile from each of the plurality of housings included in the residential complex.

In operation 502, the capacity design apparatus may synchronize a time zone for the load profile of each housing. The capacity design apparatus may extract a time zone in which power in each housing is consumed based on the load profiles of the housing and may synchronize the load profiles of the housing by time zone.

In operation 503, the capacity design apparatus may determine a load profile of the residential complex using a load profile value of each housing corresponding to the synchronized time zone. The capacity design apparatus may determine a single load profile corresponding to the residential complex by collecting power used in each housing by time zone through the load profile of each housing.

In operation 504, the capacity design apparatus may determine a power profile that includes a consumption amount and a production amount of the residential complex by time zone by analyzing the load profile of the residential complex. The capacity design apparatus may determine a solar power generation amount annually generated in the residential complex from the load profile of the residential complex, and then generate a production profile corresponding to the solar power generation amount. The capacity design apparatus may determine the power profile that includes the consumption amount and the production amount of the residential complex by time zone using the production profile and the load profile of the residential complex.

In operation 505, the capacity design apparatus may determine a reduction standard of the residential complex by analyzing a magnitude of power annually generated in the residential complex based on the power profile.

In operation 506, the capacity design apparatus may determine a capacity of each energy storage device connected to the at least one housing based on the reduction standard of the residential complex. The capacity design apparatus may determine a required power capacity and energy capacity for charging or discharging energy stored in the energy storage device based on the reduction standard, and then may determine the capacity of each energy storage device connected to the at least one housing based on the required power capacity and energy capacity.

In operation 507, the capacity design apparatus may determine cost of an energy storage device corresponding to the determined capacity of each energy storage device in consideration of a unit price per unit capacity. The capacity design apparatus may calculate cost of the energy storage device corresponding to the power capacity and the energy capacity in consideration of cost per unit capacity.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A capacity design method comprising:
   receiving load profiles of a housing from at least one housing among a plurality of housings constituting a residential complex;
   determining a power profile that includes a consumption amount and a production amount of the residential complex using a load profile of the residential complex according to the load profiles of the housing;
   determining a reduction standard according to a solar power generation amount in the residential complex from the power profile of the residential complex; and
   determining a capacity of each energy storage device connected to the at least one housing based on the reduction standard of the residential complex,
   wherein the determining of the reduction standard comprises:
      analyzing a magnitude of power annually generated in the residential complex based on the determined power profile; and
      determining the reduction standard in consideration of a peak reduction amount according to the magnitude of power, and
   wherein the capacity design method is performed by a capacity design apparatus.

2. The capacity design method of claim 1, wherein the determining of the power profile comprises generating the load profile of the residential complex by extracting a time zone in which power in the housing is consumed from each of the load profiles of the housing and by synchronizing the load profiles of the housing by the extracted time zone.

3. The capacity design method of claim 1, wherein the determining of the power profile comprises:
   determining a solar power generation amount annually generated in the residential complex from the load profile of the residential complex;
   generating a production profile corresponding to the determined solar power generation amount; and
   determining the power profile that includes the consumption amount and the production amount of the residential complex by time zone using the production profile and the load profile of the residential complex.

4. The capacity design method of claim 3, wherein the determining of the solar power generation amount comprises generating a solar power generation amount corresponding to an energy independence rate in the residential complex using a power generation profile according to a unit capacity, and
the power generation profile is information that represents an amount of power generated through solar power.

5. The capacity design method of claim 1, wherein the determining of the capacity comprises:
   determining a required power capacity and energy capacity for charging or discharging energy stored in an energy storage device based on the determined reduction standard; and
   determining the capacity of each energy storage device connected to the at least one housing based on the required power capacity and energy capacity.

6. A capacity design method comprising:
   receiving a load profile of each housing from each of a plurality of housings included in a residential complex;
   synchronizing a time zone for the load profile of each housing;
   determining a load profile of the residential complex using a load profile value of each housing corresponding to the synchronized time zone;
   determining a power profile that includes a consumption amount and a production amount of the residential complex by time zone by analyzing the load profile of the residential complex;
   determining a reduction standard of the residential complex by analyzing a magnitude of power annually generated in the residential complex based on the power profile;
   determining a capacity of each energy storage device connected to the at least one housing based on the reduction standard of the residential complex; and
   calculating cost of an energy storage device corresponding to the determined capacity of each energy storage device in consideration of a unit price per unit capacity,
   wherein the determining of the reduction standard comprises:
      determining the reduction standard in consideration of a peak reduction amount according to the magnitude of power, and
   wherein the capacity design method is performed by a capacity design apparatus.

7. The capacity design method of claim 6, wherein the determining of the capacity comprises determining a required power capacity and energy capacity for charging or discharging energy stored in an energy storage device based on the determined reduction standard and then determining the capacity of each energy storage device connected to the at least one housing based on the required power capacity and energy capacity.

8. The capacity design method of claim 7, wherein the calculating of the cost of the energy storage device comprises calculating cost of an energy storage device corresponding to the power capacity and the energy capacity in consideration of unit price per unit capacity.

9. A capacity design apparatus comprising a processor, wherein the processor is configured to
   receive load profiles of a housing from at least one housing among a plurality of housings constituting a residential complex,
   determine a power profile that includes a consumption amount and a production amount of the residential complex using a load profile of the residential complex according to the load profiles of the housing,
   determine a reduction standard according to a solar power generation amount in the residential complex from the power profile of the residential complex, and determine a capacity of each energy storage device connected to the at least one housing based on the reduction standard of the residential complex, wherein the processor is configured to analyze a magnitude of power annually generated in the residential complex based on the determined power profile, and determine the reduction standard in consideration of a peak reduction amount according to the magnitude of power.

10. The capacity design apparatus of claim 9, wherein the processor is configured to generate the load profile of the residential complex by extracting a time zone in which power in the housing is consumed from each of the load profiles of the housing and by synchronizing the load profiles of the housing by the extracted time zone.

11. The capacity design apparatus of claim 9, wherein the processor is configured to determine a solar power generation amount annually generated in the residential complex from the load profile of the residential complex, generate a production profile corresponding to the determined solar power generation amount, and determine the power profile that includes the consumption amount and the production amount of the residential complex by time zone using the production profile and the load profile of the residential complex.

12. The capacity design apparatus of claim 11, wherein the processor is configured to generate a solar power generation amount corresponding to an energy independence rate in the residential complex using a power generation profile according to a unit capacity, and the power generation profile is information that represents an amount of power generated through solar power.

13. The capacity design apparatus of claim 9, wherein the processor is configured to determine a required power capacity and energy capacity for charging or discharging energy stored in an energy storage device based on the determined reduction standard, and determine the capacity of each energy storage device connected to the at least one housing based on the required power capacity and energy capacity.

* * * * *